US012624311B2

(12) United States Patent
Helander et al.

(10) Patent No.: US 12,624,311 B2
(45) Date of Patent: May 12, 2026

(54) MULTIFUNCTIONAL CLEANER COMPRISING A MIXTURE OF BIOCHELANTS AND METHODS OF MAKING AND USING SAME

(71) Applicant: Solugen, Inc., Houston, TX (US)

(72) Inventors: Jason Helander, Richmond, TX (US); Michael J. Pawlik, Glenshaw, PA (US); LoongYi Tan, Houston, TX (US); Catherine Gonzalez, Houston, TX (US); Frederyk Ngantung, Houston, TX (US)

(73) Assignee: SOLUGEN, INC., Houston, TX (US)

( * ) Notice: Subject to any disclaimer, the term of this patent is extended or adjusted under 35 U.S.C. 154(b) by 290 days.

(21) Appl. No.: 18/290,399

(22) PCT Filed: May 17, 2022

(86) PCT No.: PCT/US2022/029617
§ 371 (c)(1),
(2) Date: Nov. 13, 2023

(87) PCT Pub. No.: WO2022/245812
PCT Pub. Date: Nov. 24, 2022

(65) Prior Publication Data

US 2024/0247208 A1 Jul. 25, 2024

Related U.S. Application Data

(60) Provisional application No. 63/189,399, filed on May 17, 2021.

(51) Int. Cl.

| | |
|---|---|
| ***C11D 1/94*** | (2006.01) |
| ***C11D 3/00*** | (2006.01) |
| ***C11D 3/43*** | (2006.01) |
| ***C11D 3/48*** | (2006.01) |
| *C11D 1/06* | (2006.01) |
| *C11D 1/10* | (2006.01) |
| *C11D 1/12* | (2006.01) |
| *C11D 1/14* | (2006.01) |
| *C11D 1/22* | (2006.01) |
| *C11D 1/28* | (2006.01) |
| *C11D 1/34* | (2006.01) |
| *C11D 1/58* | (2006.01) |
| *C11D 1/62* | (2006.01) |
| *C11D 1/66* | (2006.01) |
| *C11D 1/72* | (2006.01) |
| *C11D 1/90* | (2006.01) |
| *C11D 1/92* | (2006.01) |

(52) U.S. Cl.
CPC .............. *C11D 1/94* (2013.01); *C11D 3/0026* (2013.01); *C11D 3/43* (2013.01); *C11D 3/48* (2013.01); *C11D 1/06* (2013.01); *C11D 1/10* (2013.01); *C11D 1/123* (2013.01); *C11D 1/143* (2013.01); *C11D 1/146* (2013.01); *C11D 1/22* (2013.01); *C11D 1/28* (2013.01); *C11D 1/345* (2013.01); *C11D 1/58* (2013.01); *C11D 1/62* (2013.01); *C11D 1/662* (2013.01); *C11D 1/667* (2013.01); *C11D 1/72* (2013.01); *C11D 1/90* (2013.01); *C11D 1/92* (2013.01)

(58) Field of Classification Search
CPC .. C11D 1/002; C11D 1/29; C11D 1/62; C11D 1/65; C11D 1/66; C11D 1/72; C11D 1/83; C11D 1/90; C11D 3/10; C11D 3/43; C11D 3/48; C11D 7/06; C11D 2111/16
See application file for complete search history.

(56) References Cited

U.S. PATENT DOCUMENTS

| | | | | | |
|---|---|---|---|---|---|
| 4,048,121 | A * | 9/1977 | Chang | C11D 3/43 510/509 |
| 4,087,387 | A * | 5/1978 | Willems | C11D 1/94 510/480 |
| 5,330,558 | A * | 7/1994 | McCormick | C23G 1/22 75/715 |
| 5,380,468 | A * | 1/1995 | Gober | C11D 1/62 510/435 |
| 5,597,793 | A * | 1/1997 | Besse | C11D 3/3765 510/435 |
| 5,734,029 | A * | 3/1998 | Wulff | A61Q 19/10 536/120 |
| 7,666,264 | B2 | 2/2010 | Britton | |
| 2005/0256025 | A1* | 11/2005 | Chernin | C23F 3/02 510/490 |
| 2006/0166854 | A1 | 7/2006 | Britton | |
| 2006/0241005 | A1* | 10/2006 | Siebert | C11D 1/94 510/245 |

(Continued)

FOREIGN PATENT DOCUMENTS

| | | |
|---|---|---|
| JP | 2013133526 A | 7/2013 |
| WO | 2021/025957 A1 | 2/2021 |

OTHER PUBLICATIONS

PCT/US2022/029617 International Search Report and Written Opinion dated Aug. 3, 2022 (13 p.).

(Continued)

*Primary Examiner* — Charles I Boyer

(74) *Attorney, Agent, or Firm* — CONLEY ROSE, P.C.

(57) ABSTRACT

A metal surface cleaner comprising (i) one or more biochelants; (ii) an alkalinity source, (iii) a surfactant and (iv) a solvent. A method of treating a metal surface comprising contacting the metal surface with a composition comprising (i) one or more biochelants; (ii) an alkalinity source, (iii) a surfactant and (iv) a solvent.

20 Claims, No Drawings

(56) References Cited

U.S. PATENT DOCUMENTS

| | | | | |
|---|---|---|---|---|
| 2006/0273038 | A1 | 12/2006 | Syed et al. | |
| 2010/0190676 | A1* | 7/2010 | Smith | C11D 3/2086 510/161 |
| 2010/0234271 | A1* | 9/2010 | Scheuing | C11D 3/2065 510/465 |
| 2011/0028370 | A1 | 2/2011 | Underwood et al. | |
| 2011/0312866 | A1 | 12/2011 | Hodge et al. | |
| 2012/0065120 | A1 | 3/2012 | Kany et al. | |
| 2012/0204908 | A1* | 8/2012 | Byrne | C11D 3/30 134/29 |
| 2012/0301351 | A1 | 11/2012 | Kapic et al. | |
| 2013/0247942 | A1* | 9/2013 | Gayral Chirac | B08B 3/04 536/4.1 |
| 2015/0252302 | A1 | 9/2015 | Rieth et al. | |
| 2016/0237383 | A1 | 8/2016 | Budich | |
| 2017/0306266 | A1* | 10/2017 | Ryther | C11D 7/14 |
| 2019/0183117 | A1 | 6/2019 | Silvernail et al. | |
| 2020/0199758 | A1 | 6/2020 | Daahlenburg et al. | |
| 2022/0333042 | A1* | 10/2022 | Anderson | C11D 3/38627 |

OTHER PUBLICATIONS

Petroferm: Cleaning Products for Aerospace & Defense, OEM Approval List, Mar. 2010 (8 p.).

Adhikari, Saikat, "Alkaline Dissolution of Aluminum: Surface Chemistry and Subsurface Interfacial Phenomena," Iowa State University, Retrospective Theses and Dissertations (15828), 2008 (161 p.).

Crest Chemicals: LPA-8-TD-2015, Liquid Detergent Additive for Iron Phosphate Systems (http://crestchemicals.com/pdf/LPA-8-TD-2015.pdf) (1 p.).

Performance Specification: "Cleaning Compounds, Aircraft, Exterior," MIL-PRF-85570D, Jun. 19, 2002 (http://everyspec.com/) (25 p.).

TWI: "What is Hydrogen Embrittlement?—Caused, Effects, and Prevention," Nov. 15, 2023 (https://www.twi-global.com/technical-knowledge/faqs/what-is-hydrogen-embrittlement) (7 p.).

* cited by examiner

MULTIFUNCTIONAL CLEANER COMPRISING A MIXTURE OF BIOCHELANTS AND METHODS OF MAKING AND USING SAME

CROSS-REFERENCE TO RELATED APPLICATIONS

This application is a 35 U.S.C. § 371 national stage application of PCT/US2022/029617 filed May 17, 2022, and entitled "Multifunctional Cleaner and Methods of Making and Using Same," which claims benefit of U.S. provisional patent application Ser. No. 63/189,399 filed May 17, 2021, and entitled "Multifunctional Cleaner and Methods of Making and Using Same," each of which is hereby incorporated herein by reference in its entirety for all purposes.

STATEMENT REGARDING FEDERALLY SPONSORED RESEARCH OR DEVELOPMENT

Not applicable.

FIELD

The present disclosure generally relates to compositions and methods for treatment of metal surfaces. More particularly, the present disclosure relates to compositions and methods for treatment of amphoteric metal surfaces.

BACKGROUND

Hydrogen degradation of the structural properties of solids, referred to as embrittlement, is a fundamental problem in materials physics. Despite intense studies, the definitive mechanism of hydrogen embrittlement of metals remains poorly understood. Four general mechanisms have been proposed: (i) formation of a hydride phase; (ii) enhanced local plasticity; (iii) grain boundary weakening and (iv) blister and bubble formation. The underlying atomic processes and relative importance of the four mechanisms remain uncertain, and it is likely that a combination of these processes may contribute to embrittlement simultaneously.

Some aqueous-based commercial cleaners for metal surfaces have utilized chelating agents such as phosphonates, ethylenediamine, EDTA and other carboxylic and/or carboxylate compounds (including gluconates) to help with the sequestering of cations (such as hard water salts), with the intent of producing more effective cleaning compositions. However, surface cleaners with chelating agent additives are typically formulated as alkaline or acidic compositions.

SUMMARY

Disclosed herein is a metal surface cleaner comprising (i) one or more biochelants; (ii) an alkalinity source, (iii) a surfactant and (iv) a solvent.

Also disclosed herein is a method of treating a metal surface comprising contacting the metal surface with a composition comprising (i) one or more biochelants; (ii) an alkalinity source, (iii) a surfactant and (iv) a solvent.

DETAILED DESCRIPTION

As noted above, surface cleaners with chelating agent additives are often formulated as alkaline or acidic compositions. The use of alkaline cleaners on amphoteric metal surfaces (e.g., aluminum) has been shown to contribute to hydrogen embrittlement. This has commercial significance, for example, aluminum has widespread use in the construction of power lines, high-rise buildings, aircraft components, spacecraft components, and ships, for example. In order to mitigate the potential deleterious effects associated with hydrogen embrittlement development, many of the cleaners are formulated using organic solvents. These organic-solvent containing cleaners are characterized by a high volatile organic content and/or incorporate organic compounds that require special personal protective equipment such as respirators during application. Thus, there exists an ongoing need for compositions that effectively clean metal surfaces (e.g. aluminum) while reducing the use of organic solvents and the occurrence of hydrogen embrittlement.

Disclosed herein are compositions for removing contaminants from one or more metal surfaces. In an aspect, the composition for removing contaminants from metal surfaces is an alkaline formulation or has a pH value of greater than about 7. In another aspect, the composition for removing contaminants from a metal surface effectively removes one or more contaminants from said surface when the composition, the surrounding environment or both have an alkaline pH.

Hereinafter, the removal of one or more contaminants from a metal surface is referred to as cleaning the metal surface, and a composition that cleans a metal surface under alkaline conditions is termed a surface alkaline cleaner (SAC).

In an aspect, the SAC is used in to clean a surface containing aluminum or an aluminum alloy. Although this disclosure makes reference to the utility of the SAC in the cleaning of a metal surface comprising aluminum or an aluminum alloy, it is contemplated the SACs disclosed herein may be applied to any metal surface for which it functions to remove contaminants. In an aspect, the surface comprises a wrought alloy. Herein a wrought alloy refers to a form of aluminum alloy having aluminum as the predominant metal. In an alternative aspect, the surface comprises a cast aluminum. Herein cast aluminum refers to aluminum containing larger percentages of alloying elements when compared to wrought aluminum.

In some aspects, the metal surface may comprise an amphoteric metal. Amphoteric metals herein refer to metals that can act as both an acid and a base. In an aspect, the amphoteric metals comprise beryllium, aluminum, zinc, tin, lead, oxides thereof, an alloy thereof, or a combination thereof. In an aspect, the amphoteric metal comprises zinc, a zinc alloy, aluminum, an aluminum alloy, or a combination thereof.

In an aspect a SAC comprises (i) one or more biochelants, (ii) an alkalinity source, (iii) a surfactant and (iv) a solvent and is designated herein SAC-1. Additionally or alternatively, in an aspect, the SAC comprises (i) one or more biochelants, (ii) an alkalinity source, (iii) a surfactant, (iv) a biocide, and (v) a solvent and is designated herein as SAC-2. Additionally or alternatively, in an aspect, the SAC comprises (i) one or more biochelants, (ii) an alkalinity source, (iii) a surfactant, (iv) a biocide, (v) a defoamer and (vi) a solvent and is designated herein as SAC-3. In an aspect, the SAC (e.g., SAC-1, SAC-2, SAC-3) has a pH of from about 8 to about 13, alternatively from about 8 to about 11 or, alternatively from about 8 to about 9.5.

In an aspect, the SAC of the present disclosure comprises a chelant. Herein, a chelant, also termed a sequestrant or a chelating agent, refers to a molecule capable of bonding to or with a metal. The chelating agent is a ligand that contains two or more electron-donating groups, for example, so that more than one bond forms between each of the atoms on the ligand to the metal. This bond can also be dative or a coordinating covalent bond meaning the electrons from each electronegative atom provides both electrons to form the bond to the metal center. In an aspect, the chelant is a biochelant. As used herein, the prefix "bio" indicates production by a biological process such as using an enzyme catalyst.

In an aspect, the one or more biochelants comprise an oxidized sugar. Additionally or alternatively, in an aspect, the sugar derivative comprises an aldonic acid, uronic acid, aldaric acid or combination thereof and a counter cation. The counter cation may comprise an alkali metal (Group I), an alkali earth metal (Group II), or combinations thereof. In certain aspects, the counter cation is sodium, potassium, magnesium, calcium, strontium, cesium, or a combination thereof. In the alternative, the counter cation comprises aluminum, silica, titanium or boron.

In an aspect, the one or more biochelants comprise a glucose oxidation product, a gluconic acid oxidation product, a gluconate, glucaric acid (and salts and lactones thereof), glutamic acid, glucodialdose, gluconic acid (and its salts and its lactones), erythorbic acid (and its salts), 2-ketoglucose, or combinations thereof. The glucose oxidation product, gluconic acid oxidation product, or combination thereof is buffered to a suitable pH. Buffering can be carried out using any suitable methodology such as by using a pH adjusting material in an amount of from about 1 weight percent (wt. %) to about 10 wt. %, alternatively from about 1 wt. % to about 3 wt. %, or alternatively from about 5 wt. % to about 9 wt. % based on the total weight of the biochelant. In an aspect, the biochelant comprises from about 1 wt. % to about 8 wt. % of a caustic solution in a 20 wt. % gluconate solution.

Additionally or alternatively, the one or more biochelants comprise a buffered glucose oxidation product, a buffered gluconic acid oxidation product or combinations thereof. In such aspects, the buffered glucose oxidation product, the buffered gluconic acid oxidation product, or combinations thereof are buffered to a suitable pH such as from about 6 to about 7, using any suitable acid or base such as sodium hydroxide. In some aspects, the biochelant comprises a mixture of gluconic acid and glucaric acid, and further comprises a minor component species comprising n-keto-acids, $C_2$-$C_6$ diacids, or combinations thereof. In an aspect, the biochelant comprises the Biochelate™ metal chelation product commercially available from Solugen, Houston Texas.

In an aspect, the SAC comprises a sugar derivative such as glucaric acid, glucodialdose, gluconic acid, erythorbic acid, 2-ketoglucose, one or more salts thereof, one or more derivatives thereof, or a combination thereof. Without wishing to be limited by theory, the glucaric acid, the glucodialdose, the gluconic acid, the erythorbic acid, the 2-ketoglucose and/or any salt or derivative thereof can be obtained via a process that includes the enzymatic or chemoenzymatic oxidation of a saccharide. In an aspect, the sugar derivative is derived from glucose. For example, an oxidation biocatalyst or catalyst, for example, an enzyme, may be contacted with the sugar (e.g., glucose) under suitable conditions for the formation of a sugar derivative suitable for use in a SAC.

The one or more biochelants may be present in the SAC in amounts ranging from about 30 wt. % to about 90 wt. %, additionally or alternatively from about 5 wt. % to about 20 wt. %, or additionally or alternatively from about 10 wt. % to about 50 wt. % based on the total weight of the SAC.

In an aspect, the SAC as disclosed herein comprises an alkalinity source. Herein, an alkalinity source is included in an amount effective to adjust the pH of the SAC to the herein disclosed ranges. In an aspect, the alkalinity source comprises an alkanolamine such as 2-aminoethanol, diethanolamine, triethanolamine, or a combination thereof; an amine such as dimethylamine ($Me_2NH$), trimethylamine ($Me_3N$), ethylamine ($EtNH_2$), or a combination thereof; alkali metal hydroxides such as lithium hydroxide, sodium hydroxide potassium hydroxide, or a combination thereof; an alkali metal carbonate such as lithium carbonate ($Li_2CO_3$), sodium carbonate ($Na_2CO_3$), potassium carbonate ($K_2CO_3$), or a combination thereof; and an alkali metal silicate such as sodium silicate, potassium silicate, or a combination thereof.

In an aspect, a SAC of the type disclosed herein comprises a surfactant. In certain aspects, surfactants suitable for inclusion in the SAC may be cationic, anionic, nonionic, or zwitterionic. Examples of cationic surfactants suitable for use the present disclosure include, but are not limited to, alkyl quaternary ammonium compounds, alkyl trialkylammonium bromides, dialkyldiethylammonium chlorides, alkyl imidazolines, polyethoxylated alkylammonium chlorides, alkyldimethylbenzylammonium chlorides, alkylpyridinium chlorides, alkyl diammonium pentamethyl chlorides, one or more derivatives thereof, or a combination thereof. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds.

Examples of anionic surfactants suitable for use in the present disclosure include, but are not limited to, carboxylates, alkyl sulfates, alkyl sulfonates, alkyl aryl sulfonates, alkyl aryl sulfates, olefin sulfonates, fatty acid salts, fatty acid ester sulfonates, alkyl ether sulfates, alkyl ether phosphates, alkyl phosphate esters, alkylalcohol ethoxylate phosphate esters, alkyl phenol ethoxylate phosphates, phenol ethoxylate phosphates, alkyl ether carboxylates dialkyl sulfosuccinates, perfluoroalkanoic acids, sodium alkyl sarcosinates, one or more derivatives thereof, and combinations thereof.

Examples of zwitterionic surfactants suitable for use in the present disclosure include, but are not limited to, alkylamidopropyl betaines, alkyliminodipropionate disodiums, alkylamphodiacetate disodiums, alkylampho hydroxypropyl sulfonate sodiums, alkylamidopropylhydroxysultaines, lecithins, one or more derivatives thereof, and combination thereof.

Examples of nonionic surfactants suitable for use in the present disclosure include, but are not limited to, alkyl ethoxylates, alkyl phenol ethoxylates, sorbitan fatty acid esters, ethoxylated sorbitan fatty acid esters, alkyl polyglucosides, ethoxylated alkylamines, polyamine-ethoxylated diamines, alkylpropoxylated amines, fatty alcohols, alkylamide monoethanolamines, alkylamide diethanolamines, alkyldialkylamine oxides, alkylamides, ethoxylated amides alkoxylated alkyl phenols, alkoxylated alcohols, polyols, polyol esters, one or more derivatives thereof, and combinations thereof.

Other nonlimiting examples of surfactants suitable for use in the present disclosure include sodium stearate, sodium alkyl sulfate, sodium lauroyl sarcosinate, perfluorononanoate, perfluorooctanoate, docusate (dioctyl sodium sulfosuccinate), 4-(5-dodecyl)benzenesulfonate, perfluorooctanesulfonate and alkyl ether phosphate blends such as NAXCHEM® N-FOAM 802 is an alkyl ether phosphate blend commercially available from Nease Performance Chemicals.

The surfactant may be present in the SAC in amounts ranging from about 1 wt. % to about 99 wt % based on the total weight of the SAC.

In an aspect, a SAC of the type disclosed herein comprises a biocide. Herein a biocide is defined as a chemical substance or microorganism intended to destroy, deter, render harmless or exert a controlling effect on any harmful organism by chemical or biological means. For example, biocides can be used to control bacteria such as sulfate-reducing bacteria, slime-forming bacteria, and iron-oxidizing bacteria In an aspect, the SAC comprises a biocide. Any biocide may be a component of the SAC assuming it is compatible with the other components of the SAC. In an aspect, the biocide comprises an aldehyde, a quaternary ammonium cation, a brominated organic compound, a phosphonium salt, hydrogen peroxide, peracetic acid, bleach, derivatives thereof, or combinations thereof. Nonlimiting examples of biocides suitable for use in the SAC of the present disclosure include glutaraldehyde, a quaternary ammonium compound, a tetrakis hydroxymethyl-phosphonium sulfate, a tetrakis hydroxymethyl-phosphonium chloride, bronopol, bleach, a bromine, hydrogen peroxide, peracetic acid, citric acid, 2,2-dibromo-3-nitrilopropionamide (DBNPA), (+)-tartaric acid, (1,3,4,5,6,7-hexahydro-1,3-dioxo-2H-isoindol-2-yl) methyl (1R-trans)-2,2-dimethyl-3-(2-methylprop-1-enyl)cyclopropanecarboxylate (d-Tetramethrin), (13Z)-Hexadec-13-en-11-yn-1-yl acetate, (9Z,12E)-tetradeca-9,12-dien-1-yl acetate, (benzothiazol-2-ylthio)methyl thiocyanate (TCMTB), benzyloxy)methanol, ((E)-1-(2-Chloro-1,3-thiazol-5-ylmethyl)-3-methyl-2-nitroguanidine (Clothianidin), (ethylenedioxy)dimethanol (Reaction products of ethylene glycol with paraformaldehyde (EGForm)), (RS)-3-Allyl-2-methyl-4-oxocyclopent-2-enyl (1R,3R)-2,2-dimethyl-3-(2-methyl prop-1-enyl)-cyclopropanecarboxylate (mixture of 2 isomers 1R trans: 1R/S only 1:3) (Esbiothrin), (1R,3S)-2,2-dimethyl-3-(2-methylprop-1-enyl)-cyclopropanecarboxy late (mixture of 4 isomers 1R trans, 1R:1R trans, 1S: 1R cis, 1R: 1R cis. 1S 4:4:1:1) (d-Allethrin), (RS)-α-cyano-3phenoxybenzyl-(1RS)-cis, trans-3-(2,2-dichlorovinyl)-2,2-dimethylcyclopropanecarboxylate (Cypermethrin), 1,2-benzisothiazol-3(2H)-one (BIT), 1,3-bis(hydroxymethyl)-5,5-dimethylimidazolidine-2,4-dione (DMDMH), 1-[2-(allyloxy)-2-(2,4-dichlorophenyl)ethyl]-1H-imidazole (Imazalil), 2,2-dibromo-2-cyanoacetamide (DBNPA), 2,2',2"-(hexahydro-1,3,5-triazine-1,3,5-triyl)triethanol (HHT), 4,4-dimethyloxazolidine, 4,5-Dichloro-2-octylisothiazol-3 (2H)-one (4,5-Dichloro-2-octyl-2H-isothiazol-3-one (DCOIT)), 4-bromo-2-(4-chlorophenyl)-1-ethoxy methyl-5-trifluoromethylpyrrole-3-carbonitrile (Chlorfenapyr), 4-bromo-2-(4-chlorophenyl)-1-ethoxy methyl-5-trifluoromethylpyrrole-3-carbonitrile, 5-chloro-2-(4-chlorphenoxy) phenol (DCPP), 6-(phthalimido)peroxyhexanoic acid (PAP), 7a-ethyldihydro-1H,3H,5H-oxazolo[3,4-c]oxazole (EDHO), tetrakis(hydroxymethyl)phosphonium sulfate (THPS), tetrakis(hydroxymethyl)phosphonium chloride (THPC), a silver salt, a quaternary ammonium compound, an iodophore, a chlorine-based agent such as TRICLOSAN (5-chloro-2-(2,4-dichlorophenoxy)phenol), monochloramine, chlorohexidine, parachlorometaxylenol, peroxyacetic acid, peroxyacetate, polyhexamethylene biguanide, and combinations thereof. The biocide may be present in the SAC in amounts ranging from about 1 wt. % to about 99 wt. % based on the total weight of the SAC.

In an aspect, the SAC as disclosed herein comprises a defoamer. Herein, a defoamer refers to an additive used to lower the interfacial tension of a liquid allowing the escape of trapped gas. Any defoamer compatible with the other components of the SAC may be utilized. In an aspect, the defoamer comprises 2-octanol, oleic acid, paraffinic waxes, amide waxes, sulfonated oils, organic phosphates, silicone oils, mineral oils, dimethylpolysiloxane, or combinations thereof. The defoamer may be present in the SAC in amounts ranging from about 1 wt. % to about 99 wt. %, based on the total weight of the SAC.

In an aspect, a SAC of the type disclosed herein comprises a solvent. In one or more aspects, the solvent is an aqueous fluid. For example, the solvent comprises water from any source that does not contain compounds that adversely affect other components of the SAC. In certain aspects of the present disclosure, the aqueous fluids comprise fresh water. In another aspect, the solvent comprises a low volatility organic compound. Nonlimiting examples of low volatility organic solvents include ethylene dichloride, methylene chloride, perchloroethylene, 1,1,1-trichloroethane and trichloroethylene. In an aspect, the solvent is present in an effective amount; additionally or alternatively, the solvent comprises the remainder of the SAC when all other components of the SAC are accounted for.

In an aspect, a SAC of the type disclosed herein is a component of a disinfectant. For example, SAC-2 may be applied to a surface in need of the removal of contaminants such as one or more microorganisms.

In an additional or alternative aspect, the SAC is a metal-surface cleaner. For example, the SAC may be contacted with a metal surface prior to treatment of a surface (e.g., application of paint to the metal surface). In such aspects, the SAC may function as a pre-treatment additive that functions to remove contaminants from the metal surface in a time frame of from about 1 minute to about 1 hour, additionally or alternatively equal to or less than about 30 minutes, additionally or alternatively equal to or less than about 10 minutes, or, additionally or alternatively equal to or less than about 2 minutes. In some aspects, a SAC of the type disclosed herein while effective in the removal of contaminants during the time periods disclosed herein may be applied to a metal surface (e.g., aluminum-containing surface) for a time period suitable to meet one or more user and/or process objectives. In an aspect, a SAC of the type disclosed herein is applied to a metal surface at temperatures ranging from about 0° C. to about 50° C., additionally or alternatively from about 10° C. to about 50° ° C., additionally or alternatively from about 20° C. to about 50° C. or, additionally or alternatively equal to or less than about 50° C.

In some aspects, the SAC acts to potentiate the effectiveness of a biocide. For example, the SAC may increase the effectiveness of a biocide. Nonlimiting examples of biocides that may be potentiated by the addition of a SAC include alcohols, aldehydes, chlorine, and chlorine-releasing agents (sodium hypochlorite, chlorhexidine), iodine, peroxygen compounds (hydrogen peroxide, peracetic acid), phenolic type compounds, quaternary ammonium compounds (benzalkonium chloride), and bases (sodium hydroxide).

In some aspects, the SAC functions synergistically with a corrosion inhibitor to reduce the level of corrosion. For example, the combination of a SAC and a corrosion inhibitor may reduce the level of corrosion below the level observed in the presence of the corrosion inhibitor alone. Herein, a corrosion inhibitor refers to a chemical substance that, when added in a sufficient amount to an environment in which a metal would corrode, will reduce, slow down, or prevent corrosion of the metal. Nonlimiting examples of conventional corrosion inhibitors include phosphates, chromates, dichromates, silicates, borates, tungstates, molybdates, and arsenates. Without wishing to be limited by theory, the SAC may function to complex cations in the medium contacting the metal surface, and thus, prevent deposits that may corrode a metal surface.

In an aspect, the SAC as disclosed herein may be characterized as exhibiting increased biodegradability when compared to conventional cleaning additives such as phosphonates, quaternary ammonium chlorides, and D-limonene compounds. Herein biodegradable refers to the ability of a composition or substrate comprised of that composition to disintegrate (decompose) natural forces. Additionally, the SACs disclosed herein are advantageously non-toxic which would allow for the SACs to be applied without significant protective personal equipment.

ADDITIONAL DISCLOSURE

The following are non-limiting, specific aspects in accordance with the present disclosure:

A first aspect which is a metal surface cleaner comprising (i) one or more biochelants; (ii) an alkalinity source, (iii) a surfactant and (iv) a solvent.

A second aspect which is the cleaner of the first aspect wherein the one or more biochelants comprise aldonic acid, uronic acid, aldaric acid, a glucose oxidation product, a gluconic acid oxidation product, a gluconate, glucaric acid, gluconic acid, glucuronic acid, comprises galactonic acid, galactaric acid, an oxidation product comprising predominantly galactonic acid and/or galactaric acid with minor component species of n-keto-acids, $C_2$ to $C_6$ diacids or a combination thereof.

A third aspect which is the cleaner of any of the first through second aspects wherein the one or more biochelants further comprise a counter cation.

A fourth aspect which is the cleaner of the third aspect wherein the counter cation comprises silicates, borates, aluminum, calcium, magnesium, zinc, copper, ferric iron, ferrous iron, ammonium, sodium, potassium, cesium, strontium or a combination thereof.

A fifth aspect which is the cleaner of any of the first through fourth aspects wherein the alkalinity source comprises an alkanolamine, an amine, alkali metal hydroxides, an alkali metal carbonate, an alkali metal silicate, or a combination thereof.

A sixth aspect which is the cleaner of any of the first through fifth aspects wherein the surfactant comprises an alkyl quaternary ammonium compound, a alkyl trialkylammonium bromide, a dialkyldiethylammonium chloride, an alkyl imidazoline, a polyethoxylated alkylammonium chloride, an alkyldimethylbenzylammonium chloride, an alkylpyridinium chloride, an alkyl diammonium pentamethyl chloride, a derivative thereof, or combinations thereof.

A seventh aspect which is the cleaner of any of the first through sixth aspects wherein the surfactant comprises a carboxylate, an alkyl sulfate, an alkyl sulfonate, an alkyl aryl sulfonate, an alkyl aryl sulfate, an olefin sulfonate, a fatty acid salt, a fatty acid ester sulfonate, an alkyl ether sulfate, an alkyl ether phosphate, an alkyl phosphate ester, an alkylalcohol ethoxylate phosphate ester, an alkyl phenol ethoxylate phosphate, a phenol ethoxylate phosphate, an alkyl ether carboxylate, a dialkyl sulfosuccinate, a perfluoroalkanoic acid, a sodium alkyl sarcosinate, a derivative thereof, or combinations thereof.

An eighth aspect which is the cleaner of any of the first through seventh aspects wherein the surfactant comprises an alkylamidopropyl betaine, an alkyliminodipropionate disodium, an alkylamphodiacetate disodium, an alkylampho hydroxypropyl sulfonate sodium, an alkylamidopropylhydroxysultaines, a lecithin, a derivative thereof, or combinations thereof.

A ninth aspect which is the cleaner of any of the first through eighth aspects wherein the surfactant comprises an alkyl ethoxylate, an alkyl phenol ethoxylate, a sorbitan fatty acid ester, an ethoxylated sorbitan fatty acid ester, an alkyl polyglucoside, an ethoxylated alkylamine, a polyamine-ethoxylated diamine, an alkylpropoxylated amine, a fatty alcohol, an alkylamide monoethanolamine, an alkylamide diethanolamine, a alkyldialkylamine oxide, an alkylamide, an ethoxylated amide, an alkoxylated alkyl phenol, an alkoxylated alcohol, a polyol, a polyol ester, a derivative thereof, or combinations thereof.

A tenth aspect which is the cleaner of any of the first through ninth aspects wherein the solvent comprises an aqueous fluid, a low volatility organic solvent, or combinations thereof.

An eleventh aspect which is the cleaner of any of the first through tenth aspects further comprising a biocide.

A twelfth aspect which is the cleaner of the eleventh aspect wherein the biocide comprises an aldehyde, a quaternary ammonium cation, a brominated organic compound, a phosphonium salt, hydrogen peroxide, peracetic acid, bleach, a derivative thereof, or combination thereof.

A thirteenth aspect which is the cleaner of the twelfth aspect further comprising a defoamer.

A fourteenth aspect which is the cleaner of the thirteenth aspect wherein the defoamer comprises octanol, oleic acid, a paraffinic wax, an amide wax, a sulfonated oil, an organic phosphate, a silicone oil, a mineral oil, dimethylpolysiloxane, or combinations thereof.

A fifteenth aspect which is the cleaner of the eleventh aspect further comprising a defoamer.

A sixteenth aspect which is the cleaner of the fifteenth aspect wherein the defoamer comprises octanol, oleic acid, a paraffinic wax, an amide wax, a sulfonated oil, an organic phosphate, a silicone oil, a mineral oil, dimethylpolysiloxane, or combinations thereof.

A seventeenth aspect which is the cleaner of any of the first through sixteenth aspects having a pH of from about 8 to about 13.

An eighteenth aspect which is a method of treating a metal surface comprising contacting the metal surface with a composition comprising the metal surface cleaner of any of the first through seventeenth aspects.

A nineteenth aspect which the method of the eighteenth aspect wherein the metal surface comprises an amphoteric metal.

A twentieth aspect which is the method of any of the eighteenth through nineteenth aspects, wherein the amphoteric metal comprises zinc, a zinc alloy, aluminum, an aluminum alloy or a combination thereof.

While aspects of the presently disclosed subject matter have been shown and described, modifications thereof can be made by one skilled in the art without departing from the spirit and teachings of the subject matter. The aspects described herein are exemplary only and are not intended to be limiting. Many variations and modifications of the subject matter disclosed herein are possible and are within the scope of the disclosed subject matter. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspects of the present invention. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A metal surface cleaner, comprising:

(i) at least two biochelants, wherein the at least two biochelants comprise a gluconate, glucaric acid, gluconic acid, glucuronic acid, galactonic acid, galactaric acid, an oxidation product comprising predominantly galactonic acid, galactaric acid with minor component species of n-keto-acids, C2 to C6 diacids or a combination thereof, and wherein the at least two biochelants are present in an amount of from about 30 wt. % to about 90 wt. % based on the total weight of the cleaner;

(ii) an alkalinity source;

(iii) a surfactant; and (iv) a solvent.

2. The cleaner of claim 1, wherein the at least two biochelants further comprise a counter cation.

3. The cleaner of claim 2, wherein the counter cation comprises silicates, borates, aluminum, calcium, magnesium, zinc, copper, ferric iron, ferrous iron, ammonium, sodium, potassium, cesium, strontium, or a combination thereof.

4. The cleaner of claim 1, wherein the alkalinity source comprises an alkanolamine, an amine, alkali metal hydroxides, an alkali metal carbonate, an alkali metal silicate, or a combination thereof.

5. The cleaner of claim 1, wherein the surfactant comprises an alkyl quaternary ammonium compound, an alkyl trialkylammonium bromide, a dialkyldiethylammonium chloride, an alkyl imidazoline, a polyethoxylated alkylammonium chloride, an alkyldimethylbenzylammonium chloride, an alkylpyridinium chloride, an alkyl diammonium pentamethyl chloride, a derivative thereof, or a combination thereof.

6. The cleaner of claim 1, wherein the surfactant comprises a carboxylate, an alkyl sulfate, an alkyl sulfonate, an alkyl aryl sulfonate, an alkyl aryl sulfate, an olefin sulfonate, a fatty acid salt, a fatty acid ester sulfonate, an alkyl ether sulfate, an alkyl ether phosphate, an alkyl phosphate ester, an alkylalcohol ethoxylate phosphate ester, an alkyl phenol ethoxylate phosphate, a phenol ethoxylate phosphate, an alkyl ether carboxylate, a dialkyl sulfosuccinate, a perfluoroalkanoic acid, a sodium alkyl sarcosinate, a derivative thereof, or a combination thereof.

7. The cleaner of claim 1, wherein the surfactant comprises an alkylamidopropyl betaine, an alkyliminodipropionate disodium, an alkylamphodiacetate disodium, an alkylampho hydroxypropyl sulfonate sodium, an alkylamidopropylhydroxysultaines, a lecithin, a derivative thereof, or a combination thereof.

8. The cleaner of claim 1, wherein the surfactant comprises an alkyl ethoxylate, an alkyl phenol ethoxylate, a sorbitan fatty acid ester, an ethoxylated sorbitan fatty acid ester, an alkyl polyglucoside, an ethoxylated alkylamine, a polyamine-ethoxylated diamine, an alkylpropoxylated amine, a fatty alcohol, an alkylamide monoethanolamine, an alkylamide diethanolamine, a alkyldialkylamine oxide, an alkylamide, an ethoxylated amide, an alkoxylated alkyl phenol, an alkoxylated alcohol, a polyol, a polyol ester, a derivative thereof, or a combination thereof.

9. The cleaner of claim 1, wherein the solvent comprises an aqueous fluid, a low volatility organic solvent, or a combination thereof.

10. The cleaner of claim 1, further comprising a biocide.

11. The cleaner of claim 10, wherein the biocide comprises an aldehyde, a quaternary ammonium cation, a brominated organic compound, a phosphonium salt, hydrogen peroxide, peracetic acid, bleach, a derivative thereof, or a combination thereof.

12. The cleaner of claim 10, further comprising a defoamer.

13. The cleaner of claim 12, wherein the defoamer comprises octanol, oleic acid, a paraffinic wax, an amide wax, a sulfonated oil, an organic phosphate, a silicone oil, a mineral oil, dimethylpolysiloxane, or a combination thereof.

14. The cleaner of claim 1, having a pH of from about 8 to about 13.

15. A method of treating a metal surface, the method comprising:

contacting the metal surface with a composition comprising:

(i) at least two biochelants wherein the at least two biochelants comprise a gluconate, glucaric acid, gluconic acid, glucuronic acid, galactonic acid, galactaric acid, an oxidation product comprising predominantly galactonic acid, galactaric acid with minor component species of n-keto-acids, C2 to C6 diacids or a combination thereof and wherein the at least two biochelant are present in an amount of from about 30 wt. % to about 90 wt. % based on the total weight of the cleaner;

(ii) an alkalinity source;

(iii) a surfactant; and (iv) a solvent.

16. The method of claim 15, wherein the metal surface comprises an amphoteric metal.

17. The method of claim 16, wherein the amphoteric metal comprises zinc, a zinc alloy, aluminum, an aluminum alloy, or a combination thereof.

18. The method of claim 15, wherein the composition further comprises a corrosion inhibitor selected from the group consisting of phosphates, chromates, dichromates, silicates, borates, tungstates, molybdates, and arsenates.

19. The method of claim 15, wherein the composition further comprises a defoamer.

20. The method of claim 19, wherein the defoamer comprises octanol, oleic acid, a paraffinic wax, an amide wax, a sulfonated oil, an organic phosphate, a silicone oil, a mineral oil, dimethylpolysiloxane, or a combination thereof.

* * * * *